United States Patent [19]
Nilssen

[11] Patent Number: 5,550,439
[45] Date of Patent: Aug. 27, 1996

[54] ELECTRONIC BALLAST HAVING PULSATING OUTPUT VOLTAGE

[76] Inventor: Ole K. Nilssen, Caesar Dr., Barrington, Ill. 60010

[21] Appl. No.: 772,547

[22] Filed: Oct. 4, 1991

Related U.S. Application Data

[63] Continuation of Ser. No. 346,321, May 1, 1989, abandoned, which is a continuation of Ser. No. 686,275, Dec. 26, 1984, abandoned, which is a continuation-in-part of Ser. No. 677,562, Dec. 3, 1984, Pat. No. 4,698,553, and a continuation-in-part of Ser. No. 456,276, Feb. 22, 1983, Pat. No. 4,503,363.

[51] Int. Cl.[6] ............................................ H05B 37/00
[52] U.S. Cl. ........................ 315/244; 315/127; 315/225; 315/DIG. 7
[58] Field of Search .................................. 315/244, 242, 315/127, 125, 119, 225, DIG. 7

[56] References Cited

U.S. PATENT DOCUMENTS

| | | | |
|---|---|---|---|
| 3,662,216 | 5/1972 | Hildebrant | 315/244 |
| 4,370,600 | 1/1983 | Zansky | 315/DIG. 7 |
| 4,612,478 | 9/1986 | Payne | 315/244 |
| 4,647,820 | 3/1987 | Chormin | 315/244 |
| 5,111,114 | 5/1992 | Wang | 315/DIG. 7 |
| 5,142,202 | 8/1992 | Sun et al. | 315/225 |

Primary Examiner—Robert J. Pascal
Assistant Examiner—Reginald A. Ratliff

[57] ABSTRACT

In a fluorescent lamp ballast, a source of high-frequency voltage is applied directly across a series-resonant L-C circuit. The fluorescent lamp is connected in parallel with the capacitor of the L-C circuit and a voltage-limiting means is operative to prevent the series-resonant L-C circuit from overloading the voltage source during any period when the lamp is not effective in providing circuit loading. When power is initially applied to the series-resonant L-C circuit, a control means provides a short circuit across the capacitor; and, by way of a first current transformer, the resulting short circuit current is used for pre-heating the fluorescent lamp cathodes. After about 1.5 second, the control means provides for removal of the short circuit for a period of about 25 milli-seconds, thereby permitting the voltage across the capacitor to grow to a magnitude sufficient to ignite and operate the lamp. If the lamp ignites, the resulting lamp current is then used, by way of a second current transformer, to prevent the control means from re-providing the short circuit. If lamp current does not flow, or if it at any time ceases to flow, the control means will re-provide the short circuit within about 25 milli-seconds. Thereafter, until power is removed or until an operable lamp is connected, the control means will continuously repeat the cycle of 1.5 second short circuit and 25 milli-seconds open circuit.

27 Claims, 1 Drawing Sheet

ELECTRONIC BALLAST HAVING PULSATING OUTPUT VOLTAGE

Instant application is a continuation of Ser. No. 346,321 filed May 1, 1989 now abandoned; which is a continuation of Ser. No. 06/686,275 filed Dec. 26, 1984, abandoned; which was a continuation-in-part of Ser. No. 677,562 filed Dec. 3, 1984, U.S. Pat. No. 4,698,553, as well as of Ser. No. 456,276 filed Feb. 22, 1983, U.S. Pat. No. 4,503,363.

FIELD OF THE INVENTION

The present invention relates to high-frequency series-resonant ballasts for fluorescent lamps.

PRIOR ART AND BACKGROUND CONSIDERATIONS

High-frequency series-resonant fluorescent lamp ballasts have been previously described, such as in U.S. Pat. No. 3,710,177 to Ward and U.S. Pat. No. 4,370,600 to Zansky. However, these previously described ballasts do not provide solutions to several basic problems associated with practical applications of such ballasts. These problems relate to the excessive power drain by and the self-destructive nature of the series-resonant ballast under the condition of being connected to an inoperative lamp.

In powering a fluorescent lamp by way of a high-frequency series-resonant ballast, where the ballast constitutes a high-Q resonant L-C circuit series-excited from an AC voltage source and parallel-loaded by the fluorescent lamp, there is a serious problem associated with the situation where the fluorescent lamp for one reason or another ceases to constitute an effective load for this high-Q series-excited L-C circuit. In such a situation, which is most apt to occur toward the end of normal lamp life, the power drawn by the high-Q resonant L-C circuit from its AC voltage source is so excessively high as to cause damage to or even destruction of the L-C circuit and/or the AC voltage source. If, contrary to expectations, destruction of the circuit and/or the source does not occur, the amount of power drawn from the source will be so large as to represent an unacceptable level of energy waste—recognizing that it may often take a long time before a worn-out fluorescent lamp is replaced.

SUMMARY OF THE INVENTION

Objects of the Invention

An object of instant invention is that of providing safe and efficient high-frequency series-resonant ballasts for fluorescent lamps. Other objects and advantages of the present invention will become apparent from the following description.

BRIEF DESCRIPTION

An L-C circuit with an unloaded Q-factor of about 50 is series-connected directly across the output of a 100 Volt/30 kHz voltage source. This L-C circuit is resonant at 30 kHz, which means that it is series-resonant at the very frequency of the high-frequency voltage source.

A regular 40 Watt fluorescent lamp and a voltage-limiting means are both connected in parallel with the tank-capacitor of the L-C circuit, the voltage-limiting means being operative to limit the voltage developed across the tank-capacitor to a magnitude suitable for proper lamp starting, which magnitude is about 300 Volt.

Without the voltage-limiting means, with an unloaded Q-factor of 50 and linear circuit operation, the magnitude of the voltage developing across the tank-capacitor would have been 5000 Volt.

Under normal operation, the fluorescent lamp limits the magnitude of the voltage developing across the tank-capacitor to about 100 Volt; and at that point the loaded L-C circuit draws approximately 40 Watt of power from the source. Thus, with a loaded Q-factor of about unity and an unloaded Q-factor of 50, the implication is that the losses in the L-C circuit amount to about 2% of the total power drawn from the source under normal operating conditions.

If for some reason the fluorescent lamp should fail to constitute an effective load for the L-C circuit, the magnitude of the voltage across the tank-capacitor would increase to about 300 Volt, which implies that the power drawn from the source at that point would be about 120 Watt, with substantially all of it being dissipated in the voltage-limiting means.

If there were no voltage-limiting means present, however, the power drawn by the L-C circuit from the source-assuming no breakdown—would be about 2000 Watt, with all of it being dissipated within the L-C circuit itself.

The present invention provides for means to prevent the L-C circuit from operating in its resonant mode—and thereby to prevent it from drawing excessive power—in case the fluorescent lamp should fail even for a brief period to constitute a proper load for the L-C circuit. This effect is accomplished by a transistor operative, by way of a rectifier bridge, to provide a short circuit across the tank-capacitor whenever lamp current fails to flow for about 25 milli-seconds. With a short-circuited tank-capacitor, the amount of power drawn by the L-C circuit is negligibly small.

More particularly, a control means is connected with the L-C circuit and is operative to provide for the following functions.

a) Upon initially providing power to the L-C circuit, the control means provides for a short circuit across the tank-capacitor for an initial period of about 1.5 second; which is the length of time normally required for the cathodes of the fluorescent lamp to become fully thermionic.

b) After this initial period, the control means removes the short circuit for a period of about 25 milli-seconds; which period is long enough to provide for proper lamp starting under normal circumstances.

c) If lamp current starts to flow within this initial period, the control means operates to keep the short circuit removed for as long as lamp current flows.

d) If lamp current fails to flow within this initial period, the control means re-imposes the short circuit and keeps it so imposed for a period of about 1.5 second; whereafter it again removes the short circuit for a period of about 25 milli-seconds.

e) It the fluorescent lamp is removed from the L-C circuit, or if for other reasons it fails to continue to operate, the control means operates to provide a short circuit across the tank-capacitor within a period of about 25 milli-seconds.

f) As long as there is no lamp loading the L-C circuit, the control means tries every 1.5 second or so to start the lamp by removing the short circuit for a period of about 25 milliseconds. Thus, with a duty-cycle of about 25 milli-seconds out of 1500 milli-seconds (1.67%), the average power dissipation of the unloaded L-C circuit will be only about 2.0 Watt.

DESCRIPTION OF THE PREFERRED EMBODIMENT

DETAILS OF CONSTRUCTION

Figure 1:
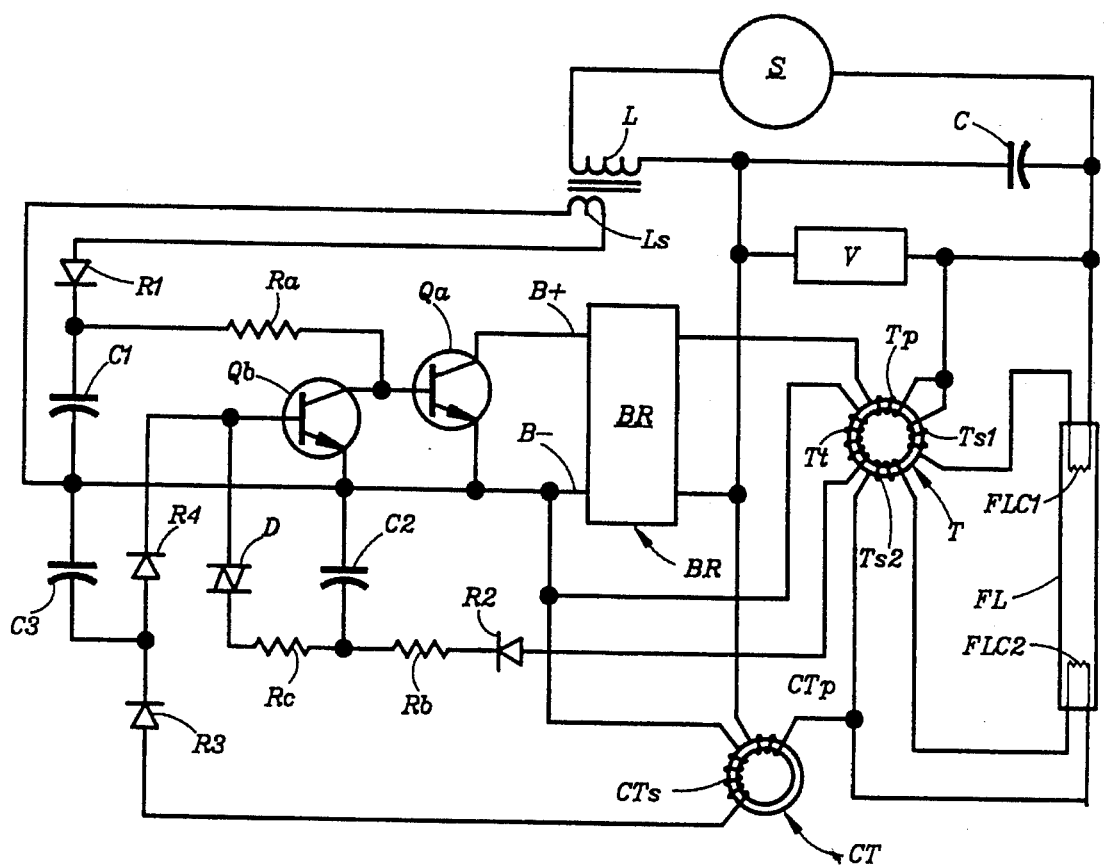
FIG. 1 provides a schematic circuit diagram of the preferred embodiment of the invention.

FIG. 1 shows an AC voltage source S, which in reality is a power-line-operated frequency converter providing an output voltage of 100 Volt RMS magnitude and 30 kHz frequency.

Connected directly across S is a series-combination of an inductor L and a capacitor C. Inductor L has a tightly coupled secondary winding Ls.

A Varistor V is connected directly across capacitor C.

A fluorescent lamp FL, having cathodes FLC1 and FLC2, is connected in series with the primary winding CTp of control transformer CT, and this series-combination of FL and CTp is connected across capacitor C.

A bridge rectifier BR, having a B+ output bus terminal and a B− output bus terminal, is connected in series with the primary winding Tp of transformer T, and this series-combination of BR and Tp is connected across capacitor C.

A transistor Qa is connected with its collector to the B+ bus and with its emitter to the B− bus.

A series-combination of a capacitor C1 and a rectifier R1, with R1 being connected with the capacitor by way of its cathode, is connected directly across the output of secondary winding Ls of inductor L. The cathode of rectifier R1 is connected to the base of transistor Qa by way of a resistor Ra.

A transistor Qb is connected with its collector and emitter to the base and emitter, respectively, of transistor Qa.

Transformer T has a first secondary winding Ts1 connected with cathode FLC1 of fluorescent lamp FL, and a second secondary winding Ts2 connected with fluorescent lamp cathode FLC2.

Transformer T also has a tertiary winding Tt, which tertiary winding is connected between the B− bus and the anode of a rectifier R2.

A series-combination of a resistor Rb and a capacitor C2 is connected between the cathode of rectifier R2 and the B− bus, with one terminal of resistor Rb being connected with the cathode of R2.

A series-combination of a resistor Rc and a Diac D is connected between the base of transistor Qb and the junction between resistor Rb and capacitor C2.

Control transformer CT has a secondary winding CTs connected between the B− bus and the anode of a rectifier R3. A rectifier R4 is connected between the cathode of rectifier R3 and the base of transistor Qb, the anode of rectifier R4 being connected with the cathode of rectifier R3.

A capacitor C3 is connected between the cathode of rectifier R3 and the B− bus.

DETAILS OF OPERATION

In FIG. 1, when the 100 Volt/30 kHz voltage from source S is initially applied to the L-C series-circuit, a voltage is developed across secondary winding Ls. This voltage is rectified and filtered by rectifier R1 and capacitor C1, and then applied to the base of transistor Qa by way of a current-limiting resistor Ra. The value of Ra is so chosen that the resulting DC current provided to the base of transistor Qa is adequate to make this transistor conduct in a substantially saturated mode and thereby to constitute an effective short circuit between the B+ bus and the B− bus.

With transistor Qa so conducting, and since transformer T is a current transformer with a very low-impedance primary winding, and since a short circuit at the output of the bridge rectifier is essentially equivalent to a short circuit at its input, there is in effect a short circuit provided across tank-capacitor C. Thus, as long as transistor Qa is an effective short circuit, the magnitude of the current drawn from the source is limited by the reactance of L, thereby in effect representing a non-dissipative load.

As long as transistor Qa conducts, current is forced through the primary winding Tp of transformer T. By transformer action, this current is provided to the effective parallel connection of the two fluorescent lamp cathodes, thereby providing to these cathodes the modest amount of power required to bring about thermionic emission. The tertiary winding Tt provides a voltage output that is used for charging capacitor C2 with a current that is limited by resistor Rb. Eventually, the magnitude of the voltage on C2 gets to be high enough to cause Diac D to break down, at which point the charge that had accumulated on capacitor C2 gets discharged into the base of transistor Qb—with the magnitude of the discharge current being principally determined by the resistance of Rc. This magnitude is so chosen that—as soon as the Diac breaks down—transistor Qb becomes conductive to the point of shunting away the base current provided to transistor Qa by way of resistor Ra.

In other words, as soon as the voltage on capacitor C2 has increased to some pre-determined magnitude, the Diac breaks down and immediately renders transistor Qa non-conductive. The time it takes for the voltage on capacitor C2 to reach this predetermined magnitude is a function of the time-constant associated with C2 and Rb as well as of the magnitude of the voltage being provided by the tertiary winding Tt. In the circuit of FIG. 1, this time was chosen to be about 1.5 second; which is the length of time normally required by fluorescent lamp cathodes to reach the point of thermionic emission.

For as long as capacitor C2 is providing base current for transistor Qb, this transistor is operative to prevent current from being applied to the base of transistor Qa, thereby making Qa non-conductive. The length of time during which Qa is thereby kept non-conductive is determined by the parameters of capacitor C2 and resistor Rc. In the circuit of FIG. 1, these parameters were so chosen as to make this length of time about 25 milli-seconds.

Thus, after the initial period of about 1.5 second, during which Qa represented a short circuit and the fluorescent lamp cathodes were provided with heating power, Qa is switched off and becomes an open circuit for about 25 milli-seconds. During this 25 milli-second period, the voltage across capacitor C increases in magnitude to the point where the lamp starts. With already pre-heated cathodes, the time required for the lamp to start is normally less than 25 milli-seconds.

As soon as lamp current starts to flow, control transformer CT, by way of rectifier R3 and filter capacitor C3, provides a DC current to the base of transistor Qb, thereby causing transistor Qb to continue to shunt away the base current for Qa. Thus, as long as the lamp starts to draw current within the 25 milli-second period, transistor Qa will continue to be non-conductive, and the lamp will continue to operate.

However, if lamp current does not start to flow within the 25 milli-second period, base current for Qb will cease, which means that Qb will cease shunting away the base current for Qa. Thus, after about 25 milli-seconds, if lamp current fails to flow, transistor Qa will again become conductive and operative to provide a short circuit across capacitor C.

Now, with Qa conductive, current will again flow through the primary winding Tp of transformer P, and again will charge C2 to the point of breaking down the Diac; which then again starts a 25 milli-second period of shunting away the base current for transistor Qa.

In other words, with the fluorescent lamp inoperative or disconnected, the circuit of FIG. 1 operates in a cyclical fashion, with each cycle consisting of a 1.5 second period during which transistor Qa is conductive—which implies that capacitor C is shorted—and a 25 milli-second period during which transistor Qa is non-conductive. With the lamp operating, on the other hand, this cyclical circuit operation is prevented by the flow of lamp current.

The lamp cathodes are supplied with heating power only as long as Qa conducts. After the lamp has ignited, however, heating power is no longer needed and is no longer supplied, thereby providing for noticably improved lamp efficacy.

It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. A ballast for a gas discharge lamp; the ballast being adapted to operate from a source of high-frequency AC voltage; the high-frequency AC voltage being provided by a frequency converter powered by the power line voltage provided by an ordinary electric utility power line; the ballast comprising:

an L-C circuit series-connected across the source; the L-C circuit being series-resonant at or near the frequency of the high-frequency AC voltage and having at least one inductive and one capacitive reactance means;

connect means operable to connect the lamp in parallel-circuit with one of said reactance means, thereby to provide for proper lamp starting and operating voltage; and control means connected in circuit with the reactance means and operative, but only when there is no current flowing through the lamp, to cause a repetitive alternation between two states: (i) a first state characterized by the provision of an effective short circuit across one of said reactance means, and (ii) a second state characterized by not providing such a short circuit; the repetitive alternation occurring at a repetition frequency substantially lower than the fundamental frequency of the high-frequency AC voltage; the magnitude of any voltage present across one of said reactance means being substantially negligible throughout the duration of the first state.

2. The ballast of claim 1 wherein the first state is further characterized by being substantially longer in duration than the second state.

3. The ballast of claim 1 wherein: (i) the frequency of the high-frequency AC voltage is substantially higher than that of the power line voltage; and (ii) the repetition frequency is substantially lower than the frequency of the power line voltage.

4. The ballast of claim 1 wherein a voltage-limiting non-linear resistance means is connected in circuit across one of said reactance means.

5. The ballast of claim 1 wherein the control means is operative as specified even when the lamp is not connected in parallel-circuit with one of said reactance means.

6. A ballast for a gas discharge lamp; the ballast being adapted to operate from a source of AC voltage and comprising:

an L-C circuit series-connected across the source; the L-C circuit being series-resonant at or near the frequency of the AC voltage and having at least one inductive and one capacitive reactance means;

connect means operable via a set of connect terminals to connect the lamp in parallel-circuit with one of the reactance means, thereby to provide across the connect terminals an output voltage suitable for proper lamp starting and operation; and control means connected in circuit with the lamp and responsive to current flowing therethrough; the control means being operative, but only when there is no current flowing through the lamp, to impose a short circuit intermittently and periodically across the connect terminals; the short circuit being so imposed at a repetition frequency substantially lower than that of the AC voltage; the repetition frequency therefore having a repetition period substantially longer than the period of the AC voltage;

whereby, as long as no current flows through the lamp, the output voltage is modulated in magnitude at said repetition frequency; the output voltage being of a relatively low magnitude for a relatively long period of time and being of a relatively high magnitude for a relatively short period of time; the relatively long period of time being at least twice as long as the relatively short period of time.

7. The ballast of claim 6 wherein the control means is functional as specified even when the lamp is not connected with the connect terminals.

8. The ballast of claim 6 wherein: (i) the frequency of the AC voltage is substantially higher than the frequency of the power line voltage normally present on an ordinary electric utility power line; and (ii) the repetition frequency being substantially lower than the frequency of the power line voltage.

9. A ballast for a gas discharge lamp; the ballast being adapted to operate from a source of AC voltage; the fundamental frequency of the AC voltage being substantially higher than that of the power line voltage normally present on an ordinary electric utility power line; the ballast comprising:

an L-C circuit adapted to series-connect across said source; the L-C circuit being resonant at or near the frequency of the AC voltage and having at least one inductive and one capacitive reactance means;

connect means operative to permit connection of said lamp in parallel-circuit with one of the reactance means; and shorting means operative to provide an intermittently interrupted short circuit across one of the reactance means; the shorting means causing any voltage existing across said one of the reactance means to be of negligible magnitude whenever a short circuit is indeed being provided; the shorting means being operative as described even when the lamp is not connected in parallel-circuit with one of the reactance means.

10. The ballast of claim 9 including voltage-limiting non-linear resistance means connected in parallel-circuit with one of the reactance means.

11. An arrangement comprising:

a gas discharge lamp means having a first and a second thermionic cathode; and an AC source operative to provide an AC voltage between a first and a second AC output terminal; the frequency of the AC voltage being about 20 kHz or higher; the first and the second AC output terminal being connected with the first and the second thermionic cathode, respectively; the AC source being characterized by including: (i) internal impedance operative to limit the magnitude of any current flowing from its AC output terminals; and (ii) control means operative, except when the gas discharge lamp draws more than a certain minimum amount of current from the AC output terminals, to cause the magnitude of the AC voltage to vary periodically at a low frequency between a relatively high level and a relatively low level; the low frequency being substantially lower than the fundamental frequency of the power line voltage;

whereby, if the gas discharge lamp were to be disconnected, or if it otherwise were to fail to draw at least said certain minimum amount of current from the AC output terminals, the RMS magnitude of the AC voltage would vary periodically between the relatively high level and the relatively low level.

12. The arrangement of claim 11 wherein: (i) at least one of the thermionic cathodes has a pair of cathode terminals; and (ii) the AC source has a transformer with at least one transformer winding connected across the cathode terminals.

13. An arrangement comprising:

an ordinary electric utility power line operative to provide an AC power line voltage at a pair of power line terminals;

circuitry connected with the power line terminals and operative to provide a high-frequency output voltage between a first pair of output terminals and a second pair of output terminals; the circuitry including control means functional to control the magnitude of the high-frequency output voltage; the fundamental frequency of the high-frequency output voltage being substantially higher than that of the AC power line voltage; and gas discharge lamp means having a first pair of lamp terminals and a second pair of lamp terminals; the first pair of lamp terminals being operable to connect with the first pair of output terminals; the second pair of lamp terminals being operable to connect with the second pair of output terminals;

the arrangement being characterized by functioning such that:

(a) whenever the lamp terminals are connected with the output terminals and a lamp current is flowing through the gas discharge lamp, the magnitude of the output voltage remains substantially constant; but (b) in case the lamp current were to cease to flow through the gas discharge lamp, or if the lamp terminals were to be disconnected from the output terminals, the magnitude of the high-frequency output voltage would vary cyclically at a relatively low frequency between a relatively low level and a relatively high level; the relatively low frequency being substantially lower than the frequency of the AC power line voltage; the relatively low frequency being characterized by having a cycle period.

14. The arrangement of claim 13 wherein, whenever the magnitude of the output voltage be varying cyclically, the magnitude of the output voltage will be at the relatively low level for a relatively large fraction of the cycle period and at the relatively high level for a relatively small fraction of the cycle period.

15. The arrangement of claim 14 wherein the cycle period has a duration between approximately 0.4 and approximately 4.0 seconds.

16. The arrangement of claim 14 wherein the relatively large fraction corresponds to a time duration between approximately 0.5 and approximately 2.5 seconds.

17. The arrangement of claim 16 wherein the relatively small fraction corresponds to a time duration between 10 and 250 milli-seconds.

18. A ballast for a gas discharge lamp; the gas discharge lamp having a first pair of lamp terminals connected with a first thermionic cathode and a second pair of lamp terminals connected with second thermionic cathode; the ballast comprising:

frequency-conversion circuit connected with the power line terminals and operative to provide a high-frequency output voltage between a first pair of output terminals and a second pair of output terminals; the frequency-conversion circuit including control circuitry functional to control the magnitude of the high-frequency output voltage; the fundamental frequency of the high-frequency output voltage being substantially higher than that of the AC power line voltage; and means to permit connection of the first pair of output terminals with the first pair of lamp terminals and the second pair of output terminals with the second pair of lamp terminals; thereby to cause the high-frequency output voltage to be applied between the first and the second thermionic cathode whenever the lamp terminals be connected with the output terminals;

the ballast being characterized by functioning such that, prior to connecting the output terminals with the lamp terminals, the magnitude of the high-frequency output voltage varies cyclically at a relatively low frequency between a relatively low level and a relatively high level; the relatively low frequency being substantially lower than the frequency of the AC power line voltage.

19. An arrangement comprising:

a source operative, when connected with a power line, to provide an AC voltage at a set of source terminals; the frequency of this AC voltage being substantially higher than that of the voltage on the power line;

a fluorescent lamp having a first and a second lamp terminal; and a circuit having a set of input terminals and a set of output terminals; the input terminals being connected with the source terminals; the output terminals being connected with the lamp terminals; the circuit being operative to cause a lamp voltage to be provided at the output terminals and therefore, as long as the lamp terminals are connected therewith, also between the first and the second lamp terminals;

the circuit being further characterized functioning such that:

(a) during an initial brief period commencing after the source has been connected with the power line, the RMS magnitude of the lamp voltage is maintained at a relatively low but substantially constant level; and (b) after this initial brief period, the RMS magnitude of the lamp voltage is increased toward a relatively high level, thereby normally to cause the lamp to ignite and to provide light.

20. The arrangement of claim 19 wherein, in case the lamp were to fail to ignite, the RMS magnitude of the lamp voltage would cycle periodically between the relatively high level and the relatively low level.

21. The arrangement of claim 20 wherein the RMS magnitude of the lamp voltage would cycle at a frequency substantially lower than that of the power line voltage.

22. The arrangement of claim 19 wherein the duration of the initial period is between one tenth of one second and about two seconds.

23. The arrangement of claim 19 wherein, in case the lamp terminals were to be disconnected from the output terminals, the RMS magnitude of the lamp voltage would cycle periodically between the relatively high level and the relatively low level.

24. An arrangement comprising:

a fluorescent lamp having a first and a second cathode; the first cathode having a first lamp terminal; the second cathode having a second lamp terminal; and a fluorescent lamp power source having first and second output terminals respectively connected with the first and second lamp terminals; the fluorescent lamp power source being operative, when connected with a power line having a power line voltage, to provide a lamp voltage between the first and the second output terminal; the fluorescent lamp power source including control circuitry functional to control the magnitude of the lamp voltage; the lamp voltage having a frequency and an RMS magnitude; the frequency being substantially higher than that of the power line voltage;

the fluorescent lamp power source being further characterized by functioning such that:

(a) during an initial brief period after having connected the fluorescent lamp power source with the power line, the RMS magnitude is maintained at a relatively low but substantially constant level; and (b) after this initial brief period, the RMS magnitude is increased toward a relatively high level, thereby normally to cause the lamp to ignite and to provide light.

25. The arrangement of claim 24 wherein, in case the fluorescent lamp were to fail to ignite, the RMS magnitude will cycle periodically between the relatively low substantially constant level and the relatively high level.

26. The arrangement of claim 24 wherein, in case the fluorescent lamp were to be disconnected, the fluorescent lamp power source is characterized by: (i) continuing to provide the lamp voltage between the first and the second pair of output terminals; and (ii) making the RMS magnitude of the lamp voltage cycle, at a frequency substantially lower than that of the power line voltage, between the relatively low substantially constant level and the relatively high level.

27. An arrangement comprising:

a gas discharge lamp having lamp terminals; and circuitry connected with the power line voltage of an ordinary electric utility power line and functional to provide a high-frequency output voltage between a pair of output terminals operable to connect with the lamp terminals; the circuitry including sub-circuitry functional to control the RMS magnitude of the high-frequency output voltage; the high-frequency output voltage being of frequency substantially higher than that of the power line voltage; the circuitry functioning such as to cause the RMS magnitude of the high-frequency output voltage: (i) to remain substantially constant whenever the gas discharge lamp is indeed connected to and drawing power from the output terminals, and (ii) to vary periodically at a frequency lower than that of the power line voltage whenever the gas discharge lamp is not connected with the output terminals.

* * * * *